United States Patent [19]

Somm

[11] 4,061,295

[45] Dec. 6, 1977

[54] SHOCK ABSORBING METHOD AND APPARATUS

[75] Inventor: Paul T. Somm, Bellevue, Wash.

[73] Assignee: The Boeing Company, Seattle, Wash.

[21] Appl. No.: 642,788

[22] Filed: Dec. 22, 1975

[51] Int. Cl.² ............................................. B64C 25/58
[52] U.S. Cl. .............................. 244/104 FP; 188/289; 188/299; 267/64 R; 267/65 D
[58] Field of Search ......... 244/104 FP, 104 R, 103 R; 188/299, 289, 285, 279, 317, 322, 282; 267/64 R, 65 D, 64 B

[56] References Cited

U.S. PATENT DOCUMENTS

| 3,039,566 | 6/1962 | Rumsey | 188/299 |
| 3,458,016 | 7/1969 | Keech | 244/104 R X |
| 3,653,613 | 4/1972 | Palmer et al. | 188/299 X |
| 3,743,222 | 7/1973 | Smith | 244/104 FP |

Primary Examiner—Trygve M. Blix
Assistant Examiner—Douglas C. Butler
Attorney, Agent, or Firm—Christensen, O'Connor, Garrison & Havelka

[57] ABSTRACT

The damping coefficient and spring constant of shock absorbing struts for commercial jet aircraft landing gears are selected to allow optimum absorption of forces on the landing gears at touchdown for an aircraft that has been descending at the maximum permissible "sinkrate" (descent rate immediately prior to touchdown). When so selected, the shock absorbing struts are unable to effectively dampen vertical oscillations of the aircraft body ensuing from a downward plunging of the weight of the aircraft due to the deployment of lift spoilers immediately after touchdown. To rapidly attenuate these post-touchdown vertical oscillations (for more efficient braking and ground handling), while still affording the proper spring constant and damping coefficient necessary for absorbing touchdown impact forces at maximum "sinkrate", the damping of each shock strut is substantially increased after the first cycle of strut compression and re-extension by automatically sensing the occurrence of touchdown, and after a predetermined time delay therefrom, actuating a damping control within each shock strut, to change the damping coefficient to an increased level.

7 Claims, 10 Drawing Figures

SHOCK ABSORBING METHOD AND APPARATUS

BACKGROUND OF THE INVENTION

The present invention generally relates to shock absorbing methods and apparatus in which impact forces are absorbed by the compression or other deformation of a spring. More particularly, the present invention concerns methods and apparatus for attenuating vertical oscillations of the body of an aircraft during landing, caused by the compression of the spring components of the landing gear shock struts at and immediately following touchdown.

The principal spring component of the aircraft's landing gear is a compressible body of air confined in a chamber internally of each shock strut. The weight of the aircraft body when supported on these spring components represents a spring mass, and upon landing, the abrupt compression of the spring components produce ensuing, natural oscillations of the body in an up-down (vertical) motion. These vertical oscillations exhibit a frequency and a decaying amplitude determined by the spring and damping characteristics of the shock struts and the weight of the aircraft body. Damping is provided by a hydraulic system internally of the shock strut that forces an incompressible fluid through a flow restrictive orifice in response to strut compression and strut extension, and thereby produces a damping force that opposes any other force tending to compress or extend the shock strut. The forced fluid flow assists the spring in absorbing energy necessary to arrest the downward motion of the aircraft's body. In particular, the spring temporarily stores its share of the absorbed energy by an initial elastic compression (followed by oscillatory reextension, compression, reextension etc.), while the forced fluid flow dissipates its share of energy in the form of heat and a consequent rise in the fluid's temperature. The degree of damping is represented by a damping coefficient, which is defined as a constant that, when multiplied by the square of the velocity of the strut compression or extension, equals the magnitude of the damping force.

Shock struts for commercial jet aircraft are designed with a damping coefficient that is primarily selected to minimize shock or spike loading of the aircraft frame and gear structure when the aircraft touches down at the maximum permissible rate of descent (sinkrate), such as 10 ft/sec. In such case, the largest forces on the landing gears occur during a load stroke cycle of the struts in which the piston and cylinder assembly of each strut is initially compressed (telescoped inwardly) by the touchdown force, and thereafter reextended as the internal spring recoils. For this first cycle, the damping coefficient must not be so great as to rigidify the system and thereby disable the strut from absorbing the energy of the touchdown. Yet the coefficient must be of sufficient magnitude to limit the rate of travel of the piston within the cylinder so that it does not overrun its mechanical limits. These design criteria result in a selected damping coefficient that cannot be varied significantly one way or the other without creating undesirable structural loads on the aircraft and its landing gear during touchdown.

After the first load stroke cycle, vertical oscillations of the sprung mass of the aircraft result in second, third, fourth load stroke cycles, etc. of the shock struts, such oscillations having a decaying amplitude dictated by the damping coefficient that has been selected for the initial touchdown cycle. These oscillations produce periodic, partial-unloading or unweighting of the aircraft wheels (during the rebound portions of the cycles), which in turn, cause variations in the available tire-to-ground frictional engagement, referred to as the ground torque. The level and consistency of the available ground torque affects the braking and ground handling of the aircraft.

Resultant vertical oscillations are accentuated by a trend in aircraft design in which advanced jet transports are provided with a rapid, aerodynamic lift decay substantially immediately after touchdown. The purpose of this post-touchdown lift decay is to place the weight of the aircraft on the ground-engaged wheels, as quickly as practical, to increase the abovementioned ground torque. Post-touchdown lift decay may be accomplished by automatic deployment of wing mounted lift spoilers soon after the wheels have touched ground. In such a case, lift is "spoiled" at a time when the shock struts are being compressed by the touchdown impact. The lost or "spoiler" lift causes the weight of the aircraft body to "plunge" onto to the landing gears, further compressing the struts. Moreover, such "plunging" is somewhat independent of the sinkrate and occurs following sinkrates well below maximum, such as 2-3 ft/sec., which in fact represent the more typical sinkrate.

In some aircraft, lift spoiler produced "plunging" is the prime cause of unwanted post-touchdown oscillations and the term "plunge mode oscillations" has been coined to describe this phenomenon.

Accordingly, it is an object of the present invention to provide an improved damping method and apparatus for a shock absorbing system.

It is another object of the present invention to minimize the amplitude of natural oscillations resulting from the interaction of the spring component and sprung mass of a shock absorbing system, when an abrupt force is applied to the sprung mass through the intermediary of the spring component.

Another object of the present invention is to effectively dampen reciprocatory oscillations occurring in a piston-cylinder shock absorbing assembly of the type having a combined compressible and incompressible fluid system in which the shock absorbing spring is a compressible body of gas (such as air), and the damping is effected by forcing an incompressible fluid (such as oil) through a flow restrictive orifice.

A further object of the present invention is to effectively dampen vertical oscillations of the body of a landing aircraft that follow the touchdown impact and/or the lift spoiler produced "plunge", and that are caused by the natural rebound of the abruptly compressed spring components of the landing gear shock struts. A further and related object is to provide such a method and apparatus while still maintaining the optimum damping coefficient for absorbing touchdown forces at the maximum sinkrate.

SUMMARY OF THE INVENTION

Briefly, these objects are achieved in accordance with the present invention by a shock absorbing method and apparatus in which the damping coefficient of the system is markedly increased after a predetermined time delay from application of a force abruptly applied to the system, such as the touchdown force on the shock struts of a landing aircraft. The increase of the damping coefficient is timed to coincide with the completion of a first reactive displacement cycle of spring compression and reextension (herein called a load stroke cycle). Second, third and succeeding displacement cycles (oscillations) are sharply attenuated by the increased damping coefficient.

With reference to the preferred embodiment of the invention to be described herein, these reactive displacement cycles occur in the form of the reciprocatory load stroke cycles of a piston-cylinder shock strut assembly of an aircraft's landing gear. Each shock strut includes both spring and damping components. The spring component is provided by a body of compressible fluid such as air confined internally of each strut while the damping is provided by a hydraulic system responsive to the reciprocation of the strut piston within the strut cylinder to force an incompressible fluid, such as oil, through a flow restrictive passage or orifice. This damping system is controllable and has two modes of operations: a first mode providing a damping coefficient optimum for absorbing the touchdown forces when the aircraft touches down at the maximum permissible sinkrate, and a second mode having a substantially higher coefficient. In operation, the touchdown is sensed by detecting the inward displacement of the shock strut piston relative to the cylinder. After a predetermined time delay from such detection a control signal is produced for switching the damping system to its second mode. At this time the coefficient is substantially increased to "hard" dampen the second and succeeding load stroke cycles of the strut causing attenuation and rapid delay of the amplitude of the correlative vertical oscillations of the aircraft body.

These and further features, objects and advantages of the method and apparatus in accordance with the present invention will become apparent to those skilled in the art from a consideration of the following detailed description and appended drawings.

DESCRIPTION OF THE PREFERRED EMBODIMENTS

Figure 1:
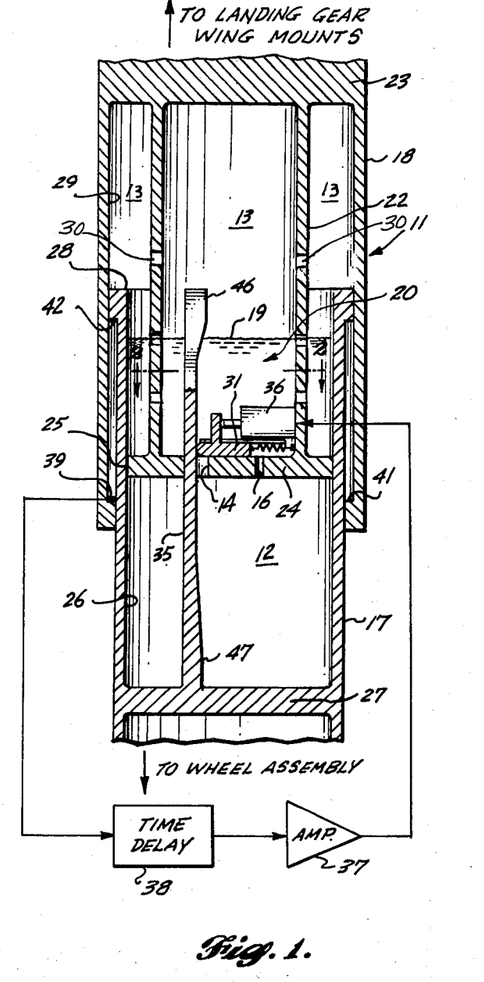
FIG. 1 is an axial, sectional view of a shock strut piston and cylinder assembly having a fluid damping system constructed for operating in accordance with the method and apparatus of the present invention, and illustrated in one of two alternative damping modes.
Figure 2:
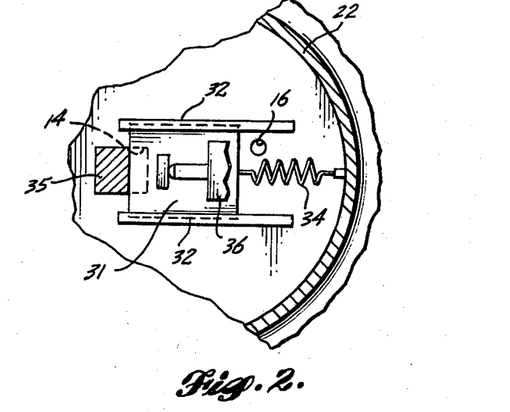
FIG. 2 is a transverse section of the assembly of FIG. 1, taken generally along section lines 2—2 thereof, in which an actuator component of the system is partially cut away for clarity.
Figure 3:
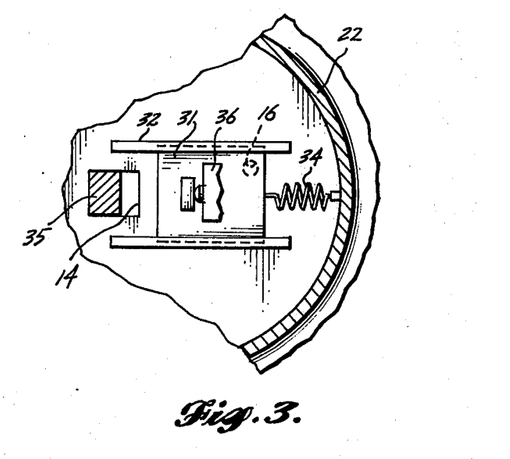
FIG. 3 is a transverse sectional view similar to FIG. 2, illustrating the above-mentioned damping system in another of its damping modes.

With reference to FIGS. 1–3, the apparatus of the present invention is embodied in an improved shock absorbing strut 11, of a landing gear of an aircraft. Strut 11 is of the type having a piston 17 reciprocatively coacting with a cylinder 18 and includes first and second fluid confining chambers 12 and 13, respectively, that are interconnected by two flow restricting orifices 14 and 16. Chamber 12 has a variable volume that changes with the position of piston 17 relative to cylinder 18, while chamber 13 is of constant volume. Chamber 12 is filled with an incompressible fluid, such as oil 20, that is forced upwardly into chamber 13 through one or the other of orifices 14 and 16, as the strut is compressed (and the volume of chamber 12 is thus decreased), with a forced return flow of oil 20 from chamber 13 to chamber 12 occurring during strut reextension. The restricted volumetric flow of oil between the chambers dampens the reaction of the strut to shock forces, and absorbs some of the energy produced by such forces.

Upper chamber 13 is partially filled with a compressible gas, usually air, above the level 19 of oil 20, so as to function as a pneumatic spring. During the compression stroke of the strut, the confined air is compressed by the upwardly moving level 19 of oil 20 (raised by the injection of oil 20 into chamber 13 from chamber 12) until the counteracting force of the air pressure equals or exceeds the externally applied forces. The compression of the body of air is resilient and functions as the spring component of strut 11 to absorb (in conjunction with the forced flow of oil 20) shock loads that might otherwise structurally damage the aircraft.

Upper chamber 13 is defined by an interior wall 29 of cylinder 18 and encompasses the free space both inside and outside of an inner cylindrical structure 22, where structure 22 is disposed coaxially within strut cylinder 18, and affixed thereto by a transverse end wall 23 that joins an upper axial end of structure 22 with cylinder 18. The cylindrical wall of structure 22 is provided with radial ports 30, such as by perforation, that communicate the regions of chamber 13 lying interiorly and exteriorly of structure 22. Orifices 14 and 16 are defined in a lower transverse end portion 24 of structure 23 that is disc shaped. The outer periphery 25 of portion 24 slideably, sealingly contacts an inner cylindrical surface 26 of an upper, hollow cylindrical portion of piston 17. Lower chamber 12 is thus bounded by: portion 24 of fixed structure 22, surface 26 of piston 17 and a transverse wall 27 defining the lower terminus of the upper hollow portion of piston 17. The upper end 28 of piston 17 is open and coaxially reciprocates between cylinder 18 and inner cylindrical structure 22, with an outwardly turned flange 42 provided adjacent piston end 28 for slideably, sealingly contacting inner surface 29 of cylinder 18.

A valve member 31 is slideably disposed on an upper surface of portion 24, and is guided by spaced apart, parallel guides 32 fixed to portion 24, for reciprocation between a first position (shown in FIG. 3) in which orifice 16 is closed by member 31 and orifice 14 is at least partially open, and a second position (shown in FIGS. 1 and 2) in which orifice 16 is open and orifice 14 is closed by member 31 in conjunction with a conventional elongate metering pin 35 upstandingly mounted on piston 17 and reciprocatively threading orifice 14. In the first position of member 31, it is displaced away from orifice 14 (FIG. 3) and the opening defined by orifice 14 is varied only by metering pin 35, fixedly carried by an upper surface of wall 27 of the piston 17, so as to reciprocate in orifice 14. By means of a longitudinally varying cross section (as discussed more fully herein), metering pin 35 varies the damping of the strut adjacent the limits of travel of piston 17.

Member 31 is biased in its first position (FIG. 3) by a tension spring 34 connected between structure 22 and member 31. To selectively shift member 31 from its first to its second position, a control means is provided including an electro-mechanical actuator 36 (such as a solenoid), an amplifier or actuator driver 37 and an electrical time delay 38.

Actuator 36, amplifier 37 and time delay 38 are operated by and electro-mechanical sensor 39, such as a microswitch, responsive to the inward displacement of piston 17 (compression of strut 11) from its position of maximum extension relative to cylinder 18. Sensor 39 is mounted on a radially inturned circumferential flange 41 provided at a lower end of cylinder 18 and is engaged by complemental flange 42 provided at an upper end of piston 17. When the piston is fully extended, such as during a landing approach, with gears down, but prior to touchdown, a lower radial surface of flange 42 maintains sensor 39 in one of two, alternative electrical states.

At the moment strut 11 is compressed from its fully extended condition, such as at touchdown, flanges 41 and 42 separate, causing sensor 39 to switch to its other electrical state, thereby producing an electrical signal. Electrical delay 38 delays this signal for a predetermined time and then issues an output control signal, which is amplified by amplifier 37 for operating actuator 36 to displace member 31 from the position shown in FIG. 3 to the position shown in FIGS. 1 and 2.

The dimensions of orifice 16 are selected to have a lesser cross-sectional flow area than that defined by the effective opening of orifice 14 (that portion of orifice 14 not obstructed by the minimum thickness or cross section of pin 35 as shown in FIGS. 1 and 3). The result is to define a first damping mode, corresponding to the first position of member 31 (FIG. 3), having a damping coefficient determined by the dimensions of orifice 14 and pin 35, and a second damping mode, corresponding to the second position of member 31 (FIGS. 1 and 2), having a damping coefficient determined by orifice 16, and being substantially higher than the first mode coefficient. The damping at the higher coefficient is sometimes referred to herein as "hard" damping.

Metering pin 35 is a conventional damping control device having an elongate dimension disposed parallel to the axis of reciprocation of the strut piston 17 and is slideably received in orifice 14 to partially, variably obstruct the flow of damping fluid therethrough. Longitudinally tapered end segments 46 and 47, of increasing cross section, are provided on pin 35 to cause increased damping as the piston approaches the limits of maximum extension and compression, relative to cylinder 18, so as to prevent harsh metal-to-metal contact when the limits are reached.

In accordance with the method of the present invention, the damping provided in strut 11 is substantially increased after the shock strut has completed a first load stroke cycle. The first cycle includes the initial compression of strut 11 in response to the touchdown impact and/or plunging 11, and includes the succeeding reextension of the shock strut as the sprung mass of the aircraft rebounds under the influence of the pneumatic spring. At the coincidence of the end of the first load stroke cycle and the beginning of the second load stroke cycle, the damping system of strut 11 is changed from its first mode to its second mode to substantially increase the damping coefficient. Preferably, the increased coefficient is approximately an order of magnitude greater than the damping coefficient existing during the first load stroke cycle. Operationally, the increase in damping is achieved by first sensing touchdown (by means of sensor 39), then after a predetermined time delay (provided by delay 38 and corresponding to the time duration of the first load stroke cycle), switching the mode of the strut damping system (by means of actuator 36 and member 31). The increased coefficient is thereafter effective during the second, third and succeeding load stroke cycles, so as to attenuate (reduce) the amplitudes of such cycles, and thereby attenuate the correlative oscillations of the aircraft's body.

Figure 4:
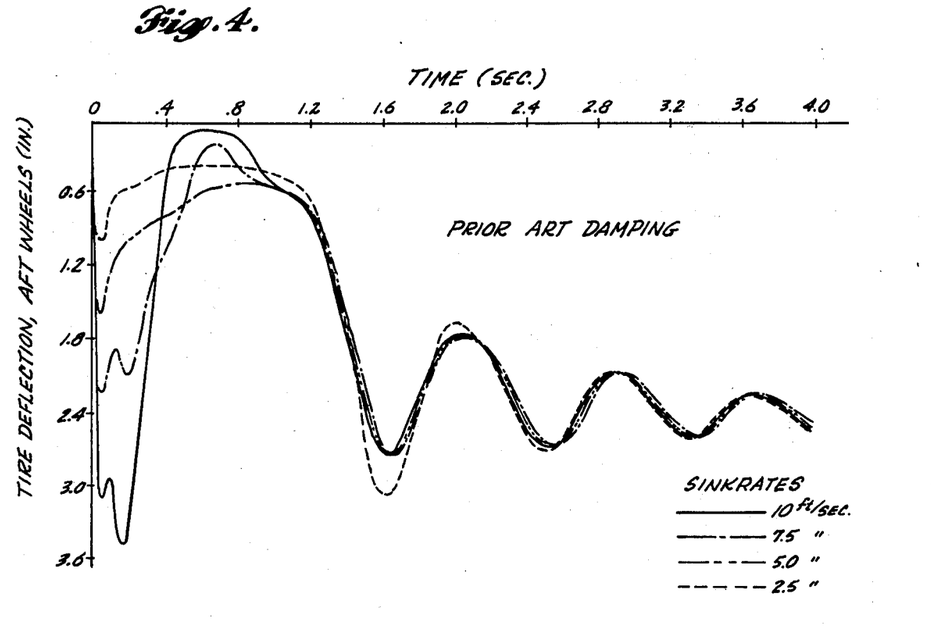
FIG. 4 is a graph of the amplitude of deflection (vertical axis) of the tires of the landing gear wheels, as a function of time (horizontal axis), for various sinkrates of the aircraft having a landing gear shock strut not equipped with present invention in order to illustrate the performance of the strut when the damping coefficient, selected for the initial touchdown impact is maintained at the same level after touchdown. Time zero corresponds to touchdown.
Figure 5:
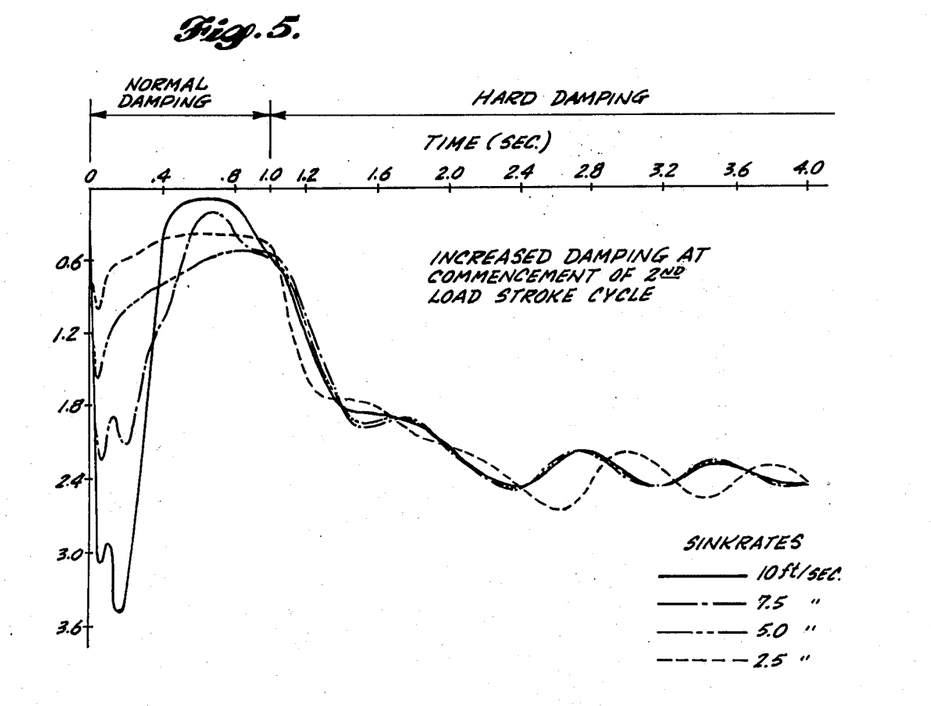
FIG. 5 is a graph of tire deflection amplitude for the same time scale and same sinkrates as shown in FIG. 4, with the shock strut equipped with improved damping in accordance with the method and apparatus of the present invention.
Figure 6:
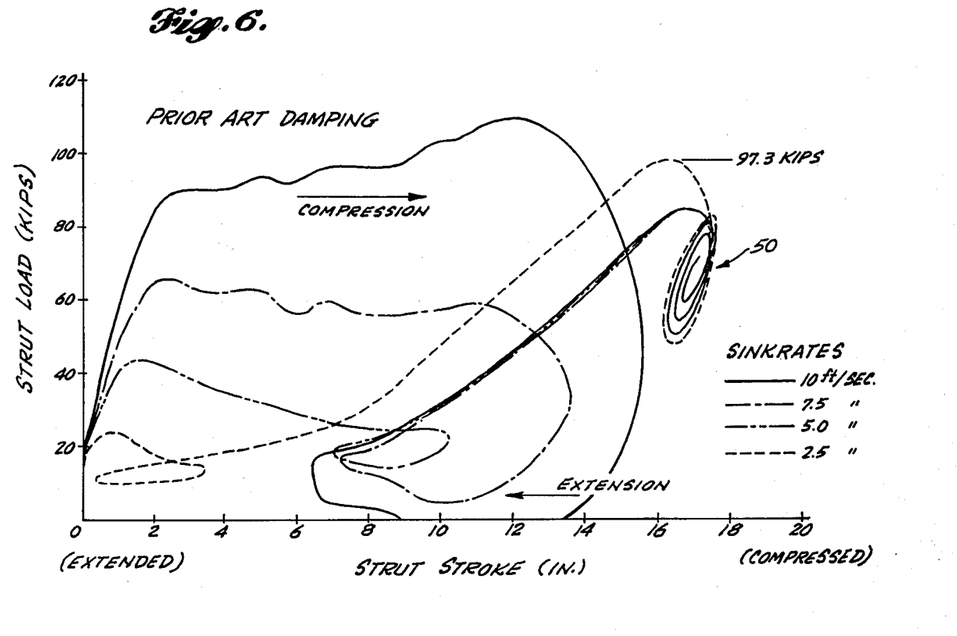
FIG. 6 is a graph of the magnitude of the compression load (vertical axis) on a shock strut of the type referred to above in connection with FIG. 4, as a function of the displacement (horizontal axis) of the shock strut between its extended and compressed positions, for various aircraft sinkrates.
Figure 7:
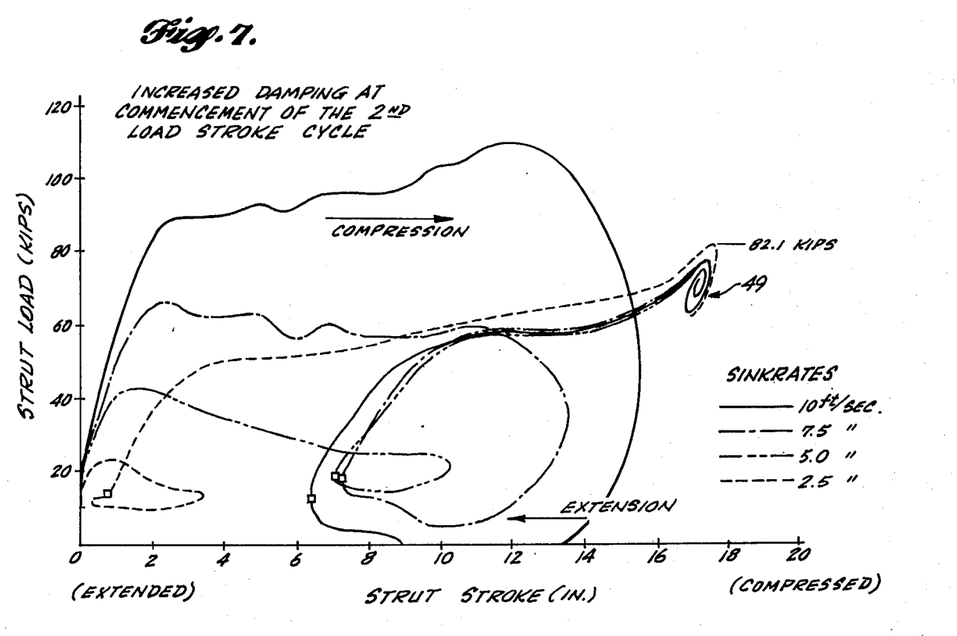
FIG. 7 is a graph of the same parameters as shown in FIG. 6, with the shock strut being dampened in accordance with the method and apparatus of the present invention.

The reduction of the amplitude of the oscillations by the present invention is illustrated by comparing the graphs in FIGS. 4 and 6 (not using the invention) with the graphs in FIGS. 5 and 7 (using the invention). FIGS. 4 and 5 show the amplitude of the deflection of the landing gear tires as a function of time, for various aircraft sinkrates and are representative of the load stroke cycles of the shock strut. In both these figures, time zero represents touchdown, and the first load stroke cycle in each figure spans the interval between time zero and approximately one second. During this first interval, the damping is normal and is the same for both graphs and the strut in each case is compressed from its fully extended condition to a shortened condition, whereupon the internal forces of the pneumatic spring cause a rebound or reextension of the strut. The deflection of the tires during the first cycle (0 to approximately 1 sec.) reaches a peak amplitude during strut compression, indicated for example in FIGS. 4 and 5 as occurring at approximately 0.2 seconds. The tire deflection amplitudes (in FIGS. 4 and 5) are the same during the first load stroke cycle. In FIG. 5, however, after the first cycle, (corresponding to the interval 0–1 second approximately), the strut 11 is changed to the higher damping coefficient, and as seen by a comparison of the figures the second, third and succeeding load stroke cycles (represented by tire deflection) are attenuated in the FIG. 5 graph, relative to corresponding deflection amplitudes in FIG. 4.

The peak amplitudes of the tire deflection depend on the rate at which the aircraft sinks into touchdown. FIGS. 4 and 5 show tire deflections for landing sinkrates of 10, 7.5, 5 and 2.5 feet per second. A 10 feet per second sinkrate is, in this case, the maximum rate at which a safe landing can be achieved. The 10 feet per second sinkrate results in a maximum peak tire deflection (3.6 inches on the vertical scale) that occurs during the first load stroke cycle, and causes the most severe structural loading on the landing gears and aircraft frame. Accordingly, the damping coefficient for the first cycle is selected to meet the design requirements dictated by this maximum sinkrate condition, with such selection resulting in a coefficient that is limited to a relatively well-defined, narrow range of permissible values. Heretofore the damping coefficient selected on this basis would be maintained throughout the second, third and succeeding load stroke cycles, resulting in relatively large amplitude, post-touchdown oscillations.

With the present invention these oscillations have been greatly attenuated, and yet by a method that provides for normal damping (first mode) during the initial load stroke cycle, to meet the design requirements associated with maximum sinkrate.

While the first mode damping is necessary to accommodate those landings that are effected at the maximum sinkrate, the great majority of landings occur at a lesser sinkrate, such as from 2-3 feet per second. In such case, the maximum strut compression load may occur, not during the first load stroke cycle, but during the second cycle, particularly for aircraft equipped with lift spoilers (such as model 727-300, a commercial transport aircraft manufactured by The Boeing Company of Seattle, Wash.), where plunge mode oscillations are severe. This result is shown in FIG. 4, where at a 2.5 feet per second sinkrate, the maximum tire deflection amplitude occurs at the peak of the second cycle (at approximately 1.6 seconds). The present invention effectively attenuates these relatively large amplitude plunge mode oscillations as shown by the plotted 2.5 feet per second sinkrate in FIG. 5.

Similarly, FIGS. 6 and 7 compare the previous damping technique (FIG. 6) with that of the present invention (FIG. 7) in terms of the peak loading on the shock strut as a function of the displacement or stroke of the shock strut. In both figures, the horizontal axis represents the strut stroke (in inches) with the zero unit corresponding to maximum extension of the strut. Increasing units along the horizontal axis represent increasing compression of the strut piston into the strut cylinder. Using the example of a maximum sinkrate of 10 feet per second and comparing the graphs of FIGS. 6 and 7, it will be observed that the load (in kips) versus stroke is the same for the initial compression stroke during which the load increases to approximately 100 kips (each kip equals 1,000 pounds weight). At this load, the strut is compressed by approximately 14 to 15 inches; whereupon the pneumatic spring of the strut and the sprung mass of the aircraft begin to rebound, causing a decreasing load (unloading) on the strut. The load decreases essentially to zero as the strut reextends. The reextension continues until the strut is compressed approximately 6 ½ inches in this example. At this juncture, the strut has completed its first load stroke cycle and is poised for commencing the second load stroke cycle. Up to this point, the graphs in FIGS. 6 and 7 are the same, inasmuch as the present invention provides normal damping through the first load stroke cycle.

During the second load stroke cycle shown in FIG. 6 (with the same damping as in the first load stroke cycle), the strut is compressed through a substantial distance (6.5 to 17 inches) while the load on the strut increases (16 kips-83 kips), at first slowly (during the travel from 6.5 to 10 inches) and then more rapidly to a peak (during the travel from 10 to 17 inches).

In comparison, using the same sinkrate of 10 feet/sec, reference is made to FIG. 7 in which increased damping, initiated at the commencement of the second load stroke cycle (denoted in the figure by the square boxes superimposed on the plots) causes the load on the shock strut to increase rapidly to approximately 60 kips with slight strut compression (6.5 inches to 10 inches), with the load thereafter rising to approximately 80 kips at maximum strut compression (17 inches). As can be seen, the dampened second load stroke cycle quickly places the weight of the aircraft on the ground and thereafter maintains fairly uniform loading on the landing gear strut to permit smooth, efficient braking of the aircraft. Similarly, the third, fourth and succeeding load stroke cycles are dampened for rapid reduction of oscillation amplitude as indicated by the contracted oscillatory loops 49 centered about the steady state load-stroke condition in FIG. 7 when compared to the relatively larger amplitude, oscillatory loops 50 in FIG. 6.

A similar improvement is made in the plunge mode oscillations associated with the lesser sinkrates. For example, the maximum load on the strut for a sinkrate of 2.5 feet per second occurs during the second load stroke cycle, and in this example, the maximum peak load has been reduced from 97.3 kips (FIG. 6) to 82.1 kips (FIG. 7).

Although the method of the present invention can be practiced by switching to the increased damping at when the strut reaches a condition of maximum reextension following the initial compression it is preferable to use a fixed time delay function for determining the switch-over point. More particularly, it has been found that the completion of the first load stroke cycle (as represented by the square boxes marking the points of maximum strut reextension in FIG. 7), occur at a predictable time delay following touchdown. This time delay, moreover, is substantially the same for all permissible sinkrates.

Thus, with reference to FIGS. 1 and 5, the embodiment disclosed herein provides a predetermined time delay (one second in this instance), between touchdown and the transition to "hard" damping. In the apparatus of FIG. 1, the one second time delay is developed by electrical time delay 38, which energizes actuator 36 through amplifier 37, and disposes the strut damping system in the second ("hard") damping mode. The duration of the second mode should last for at least 5 to 10 seconds and for this purpose delay 38 may be constructed to produce a delayed control signal that expires after a predetermined time, such as 10 seconds, thereby automatically restoring the strut to its first damping mode after a time at which the post-touchdown oscillations have ceased.

The amount of delay between touchdown and "hard" damping and the particular damping coefficients and spring constants will vary, depending upon the characteristics of each aircraft. Although it can be calculated or estimated using theoretical analysis, a preferred approach is to determine the time delay by empirical analysis. The latter can be accomplished by using empirically derived computer models of the spring-mass system, or by employing known "drop testing" equipment of the type widely used in the aircraft industry for testing shock struts. In "Drop testing", the dynamic response of a particular shock strut configuration can be determined by dropping an appropriately weighted prototype shock strut from different heights, and measuring the dynamic oscillatory response resulting therefrom. In this manner, a dynamic response, such as shown in FIGS. 4–7 may be ascertained for a particular shock strut, and based thereon the appropriate time delay may be established. The parameters referred to herein and shown in FIGS. 4 through 7 are exemplary of typical values which may be encountered in practicing the present invention.

Although, a delay time closely coinciding with the completion of the first load stroke cycle is preferred, in practice, it has been found that a time delay within ten percent of the duration of the first load cycle is satisfactory.

Figure 8:
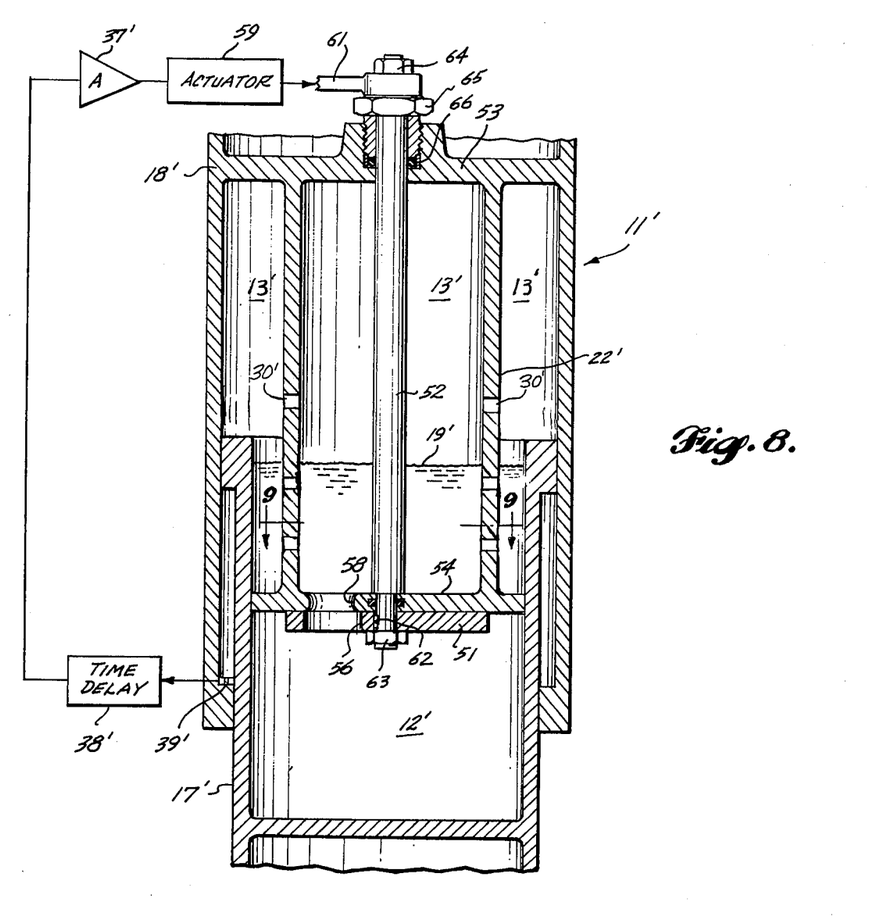
FIG. 8 is an axial sectional view of an alternative embodiment of a shock strut constructed for operating in accordance with the damping method and apparatus of the present invention.
Figure 9:
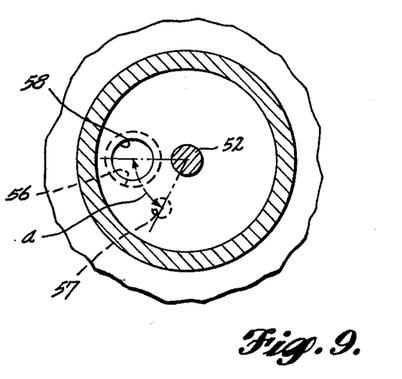
FIG. 9 is a transverse sectional view taken generally along section lines 9—9 of FIG. 8 and showing one operating mode of an electro-mechanical means that determines the damping coefficient.
Figure 10:
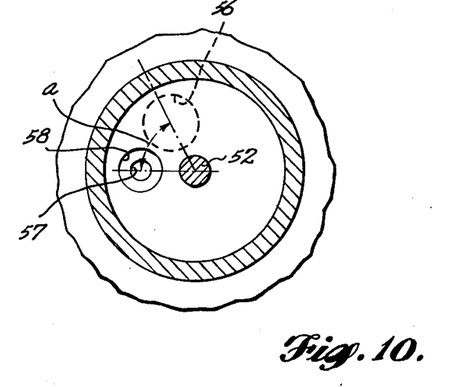
FIG. 10 is a transverse sectional view similar to FIG. 9, illustrating the electro-mechanical means of FIG. 8 in another coefficient determining mode.

FIGS. 8, 9 and 10 illustrate an alternative embodiment of the apparatus in accordance with the present invention. This embodiment is similar to that of FIGS. 1 through 3; however, the metering pin 35 (FIG. 1) is omitted and an alternative damping control mechanism is provided. For convenience, the features of the shock strut shown in FIGS. 8 through 10 corresponding to the same or similar features already described above in connection FIGS. 1 through 3 are identified by like reference numerals with the addition of a prime notation. Thus, a piston 17' is disposed for reciprocation in a cylinder 18' of an aircraft shock strut 11'. The damping coefficient is controlled by selectively enabling different sized orifices provided in a disc shaped member 51, mounted for rotation about an axis concentric with the cylinder and piston assembly. Rotation of member 51 is effected by a concentrically disposed control shaft 52 journaled in an upper transversely extending end wall 53 of cylinder 18' and journaled in a lower, transversely extending circular portion 54 of inner cylindrical structure 22' for rotation relative to cylinder 18' and structure 22. A member 51 is non-rotatably fixed to the lower end of shaft 52 by a spline 62 and a nut 63. An upper surface of member 51 slideably, rotatably contacts a lower surface of portion 54 and a pair of orifices 56 and 57 having circular cross-sections, are formed in member 51 and are selectively registerable with an orifice 58, also of circular section, provided in portion 54.

A first damping mode is provided by rotating member 51 to a position in which orifice 56 is in registry with orifice 58 as shown in FIGS. 8 and 9. In this mode, circular orifice 58, being of lesser cross section than orifice 56, determines the rate of flow of the damping fluid and thus determines the damping coefficient.

The second damping mode is obtained by rotating member 51 to the position shown in FIG. 10, so that orifice 57, having a lesser cross section than orifice 58, determines the rate of fluid flow and thus establishes the damping coefficient. Since orifice 57 is relatively smaller than orifice 58, the second mode (shown in FIG. 10) establishes the "hard-damping" configuration.

Rotation of member 51 between the first and second mode positions is effected by rotating shaft 52 through the angle a, indicated in FIGS. 9 and 10, by means of an electro-mechanical actuator 59 operating a crank arm 61. One end of crank arm 61 is non-rotatably attached, by a spline (not shown) and nuts 64 and 65, to an upper end of shaft 52 that protrudes exteriorly of chamber 13' through a seal assembly 66, while the other end of arm 61 is connected (shown schematically, only) to an actuator 59 having a rectilinear actuation stroke so as to convert the translatory motion of the actuator into rotational movement of shaft 52 and disc 51, in a manner well known.

The operation of the embodiment in FIGS. 8–10 is the same in principle, as the above described operation of strut 11 in FIGS. 1–3, with shaft 52 and member 51 being initially disposed in the first damping mode (FIGS. 8 and 9) and thereafter displaced, in response to sensor 39', delay 38', amplifier 37', actuator 59 and arm 61, to the second damping mode (FIG. 10).

While only a limited number of embodiments of the present invention have been disclosed herein, it will be readily apparent to persons skilled in the art that numerous changes and modifications may be made thereto without departing from the spirit of the invention.

What I claim is:

1. In a method of absorbing an impact force exerted on a landing gear of an aircraft when landing by reacting such impact force with a displaceable spring component of a landing gear shock absorber and damping ensuing reactive displacement oscillations of the spring component by forcing a fluid through a controllable, flow restricting orifice means that interconnects first and second fluid containing chambers provided in said landing gear shock absorber, the improvement comprising;

initially controlling the flow restricting orifice means to provide a coefficient of damping having a first predetermined value;

sensing an initial displacement of the spring component caused by touchdown of the landing aircraft; and after a predetermined time delay initiated by the step of sensing said initial displacement, controlling said orifice means to provide a damping coefficient having a second predetermined value that is substantially greater than said first value, said predetermined time delay being selected to substantially equal the time required for the spring component to complete a first cycle of said reactive displacement oscillations in reaction to the impact force associated with touchdown.

2. An apparatus for damping reactive displacement oscillations of a sprung mass in a system including a spring shock absorber interposed between the sprung mass and an unsprung mass, wherein such oscillations occur in response to an impact force applied to the unsprung mass and transmitted to the sprung mass through the spring shock absorber, comprising:

controllable damping means for providing a first damping mode having a first damping coefficient and for providing a second damping mode having a second damping coefficient that is substantially greater than said first damping coefficient;

sensing means for sensing the application of an impact force to the unsprung mass; and control means for initially causing said damping means to assume said first damping mode and for responding to said sensing means for causing said damping means to assume said second damping mode after a time delay from said application of an impact force to the unsprung mass, said control means including a delay means for causing the duration of said time delay to substantially equal the time interval required for the sprung mass to complete a first cycle of its reactive displacement oscillations.

3. The damping apparatus set forth in claim 2, wherein said damping means provides in its second damping mode a damping coefficient of at least one order of magnitude greater than the damping coefficient of said first mode.

4. In an aircraft landing gear shock strut of the type including a cylinder and a piston in which the piston is arranged for reciprocation in the cylinder between extended and compressed positions, and pneumatic spring means responsive to the reciprocation of the piston in the cylinder for developing a spring force urging the piston towards its extended position, and hydraulic means for damping the reciprocation of the piston in the cylinder, the combination therewith comprising:

sensing means for sensing an initial displacement of said piston from its extended position toward its compressed position in reaction to touchdown of a landing aircraft, said sensing means including means for producing an electrical timing signal indicating the time of said initial displacement;

fluid control means for providing first and second damping modes in association with said hydraulic means, said first mode providing a first predetermined damping coefficient and said second mode providing a second predetermined damping coefficient that is substantially greater in value than said first predetermined damping coefficient; and timing control means including signal delay means for delaying said timing signal by a predetermined time delay and causing said fluid control means to initially assume said first mode and for responding to said timing signal after it has been delayed by said delay means for causing said fluid control means to assume said second mode after said predetermined time delay, said predetermined time delay provided by said delay means being substantially equal the time interval that is defined by the duration of a first reactive cycle of compression and reextension of said piston in said cylinder in response to an impact force associated with the touchdown of the landing aircraft.

5. The combination set forth in claim 4, wherein said fluid control means provides in its second mode, a damping that is at least one order of magnitude greater than the damping coefficient associated with said first mode.

6. In a method of absorbing the impact of a force, abruptly applied to a mass, by interposing a spring between the applied force and the mass such that the spring undergoes oscillatory displacement in reaction to the abruptly applied force and wherein the amplitude of such displacement decays with time, the improvement comprising:

sensing the application of said applied force;

initially damping the displacement of the spring with a damping coefficient that has a first predetermined value;

after a predetermined time delay from the step of sensing, damping the displacement of the spring with a damping coefficient that has a second predetermined value that is greater than the first value; and, said time delay being substantially equal to the time interval that is defined by the time duration required for the spring to complete a first cycle of said oscillatory displacement.

7. In the method of claim 6, said time delay being within a range of values that are within ten percent of said time duration required for the spring to complete a first cycle of said oscillatory displacement.

* * * * *